United States Patent

Collier

[15] 3,678,508

[45] July 18, 1972

[54] COMPACT FREQUENCY SELECTIVE RINGER

[72] Inventor: Robert W. Collier, Rochester, N.Y.

[73] Assignee: Stromberg-Carlson Corporation, Rochester, N.Y.

[22] Filed: Dec. 22, 1969

[21] Appl. No.: 887,051

[52] U.S. Cl. ....................340/392, 340/396, 340/397, 340/401

[51] Int. Cl. ....................G10k 1/064

[58] Field of Search ....................340/392, 396, 397, 400, 401, 340/402

[56] References Cited

UNITED STATES PATENTS

| | | | |
|---|---|---|---|
| 2,265,066 | 12/1941 | Deuaux | 340/397 |
| 2,692,380 | 10/1954 | Cleaveland | 340/401 |
| 2,225,558 | 12/1940 | Edwards | 340/392 |
| 1,169,991 | 2/1916 | Neahr | 340/396 |
| 1,994,560 | 3/1935 | Brewer | 340/392 |
| 2,273,688 | 2/1942 | Bolz | 340/392 |
| 3,172,100 | 3/1965 | Houdek | 340/401 |
| 2,147,498 | 2/1939 | Rittenhouse | 340/392 |

*Primary Examiner*—Robert L. Griffin
*Assistant Examiner*—Joseph A. Orsino, Jr.
*Attorney*—Charles C. Krawczyk

[57] ABSTRACT

A ringer having an electromagnetic circuit and a movable armature operating a clapper assembly is positioned within a gong so that a clapper strikes the gong upon energization of the electromagnetic circuit. The opening of a resonator is mounted adjacent to the gong. The armature carries a rod which extends out from under the gong and through the opening to carry a weight within the resonator. The weight is used to adjust the frequency response of the ringer.

9 Claims, 10 Drawing Figures

ROBERT W. COLLIER
INVENTOR.

BY Charles C. Krawczyk
Ann C. Williams
ATTORNEYS

ROBERT W. COLLIER
INVENTOR.

BY Charles C. Krawczyk
Ann C. Williams
ATTORNEYS

COMPACT FREQUENCY SELECTIVE RINGER

BACKGROUND OF THE INVENTION

This invention relates to telephone ringers in general, and more particularly to frequency selective telephone ringers.

In recent years there has been a tendency to reduce the size and weight of telephone sets. This has resulted in the development of a telephone set having the dial mechanism positioned within the handset and having a ringer mounted in a small base that approaches the size of the handset. In order to reduce the size of the base, the size of the ringer required substantial reduction. A large amount of time and effort have been directed to the redesign of the ringer with a view toward space conservation and reduction in the size and weight of the ringer without limiting the operating capabilities of the ringer.

A significant advance in the design of the telephone ringer from the viewpoint of economical use of available space and reduction in size was made in the ringer disclosed in U.S. Pat. No. 3,116,481 issued jointly to W. Kalin and R.A. Spencer on Dec. 31, 1963. This ringer has found wide use in modern compact telephone sets used on telephone lines having a single party. The Kalin ringer, as presently used in telephone sets, has a resonator mounted on a common base or support plate with the ringer. An opening in the resonator is adjacent to the gong. The resonator is held in place by means of a screw projecting through the resonator.

The use of multi-party telephone lines makes it desirable to have a frequency selective ringer that functions in the manner as disclosed in U.S. Pat. No. 2,692,380 issued to L.A. Cleaveland on Oct. 19, 1954. A frequency selective ringer provides a means of calling independently any one of a number of parties on a single telephone line without alerting any of the unwanted parties on the same line. For example, three ringers, each tuned to a different frequency may be connected between one side of the line and ground. In this manner, any one of the three parties may be called by choosing the proper signal frequency and applying the signal to the connected side of the line and ground.

A frequency selective ringer must have a high degree of selectivity so as to ring on the specified ringing frequency with little or no tendency to ring on any of the other ringing frequencies or harmonics of these frequencies a few cycles removed from the specified frequency. A frequency selective ringer should also have a high degree of sensitivity. It must ring on the specified frequency with a minimum of electrical power. In addition, a frequency selective ringer should have a high degree of frequency stability and should remain tuned to a selected frequency.

The present trend in the telephone industry is in the direction of producing compact telephone sets wherein the size of the ringer becomes an important factor. In the case of frequency ringers, they must fit into the available space for non-frequency selective ringers. In addition, frequency ringers for modern telephone sets should have a simple and easily accessible means for tuning them to a selected frequency.

Accordingly, an object of this invention is to provide a new and improved miniaturized frequency selective ringer.

Another object of this invention is to make a new and improved miniaturized frequency ringer which fits in the space available for non-frequency selective ringers in modern compact telephone sets.

It is also an object of this invention to provide a new and improved miniaturized frequency ringer having a readily accessible and simple means for adjusting the resonant frequency of the ringer.

BRIEF DESCRIPTION OF THE INVENTION

A ringer having an electromagnetic circuit and a movable means responsive to magnetic flux generated by an electromagnetic circuit is positioned within a gong so that the movable means strikes the gong upon energization of the electromagnetic circuit. A resonator with an opening formed in it is mounted adjacent to the exterior of the gong so that an extension means connected to the movable means can extend out of the gong and into the resonator through the opening.

DETAILED DESCRIPTION OF THE PREFERRED EMBODIMENT

Figure 5:
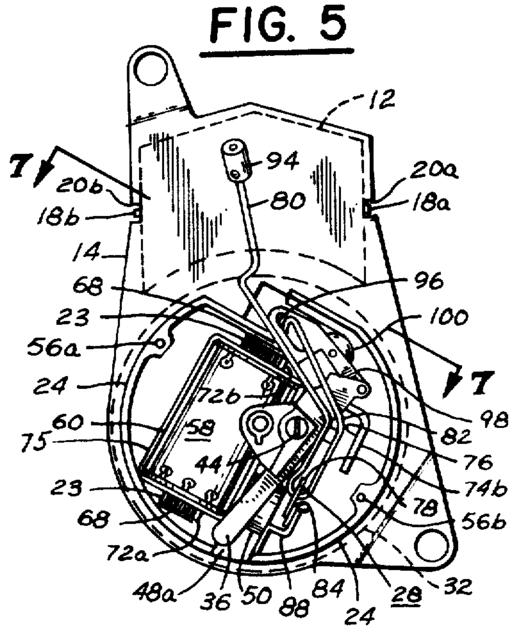
FIG. 5 shows a top view of the ringer of FIG. 1 with the resonator and the gong in phantom.

Referring now to the drawings, a ringer assembly 10 and a resonator 12 are mounted on a support plate 14. The resonator 12 has an opening 16 on the side adjacent to the ringer assembly 10. The resonator 12 is made of plastic and has two molded projections 18a and 18b which fit into a pair of openings 20a and 20b (FIGS. 5 and 6) in the support plate 14 to properly position the resonator 12 on the support plate 14 with respect to a ringer gong 32. A spring clip 22 is placed around the outside of the resonator 12 and partially under the support plate 14 to attach the resonator 12 to the support plate 14.

Figure 1:
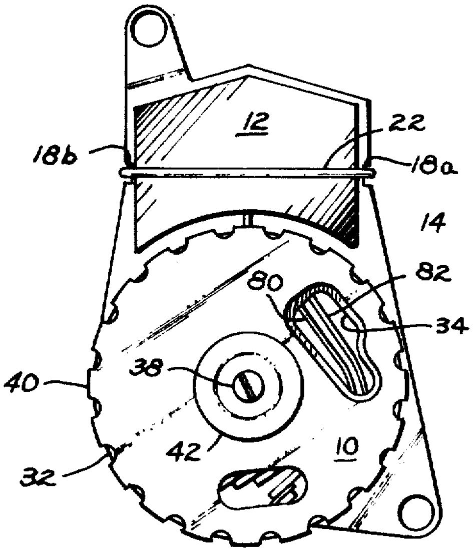
FIG. 1 shows a top view of the frequency ringer of the invention illustrating a gong and a resonator mounted on a common base or support plate.
Figure 2:
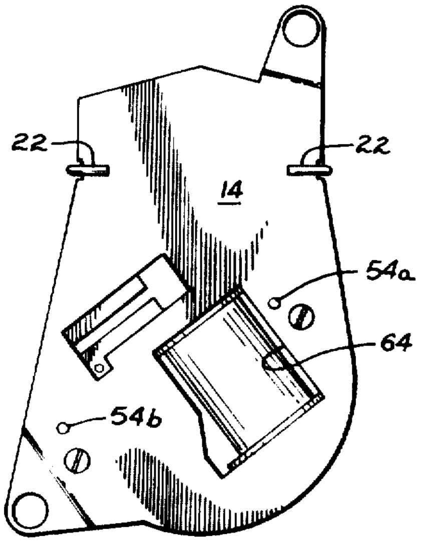
FIG. 2 shows a bottom view of the ringer of FIG. 1.
Figures 3, 4:
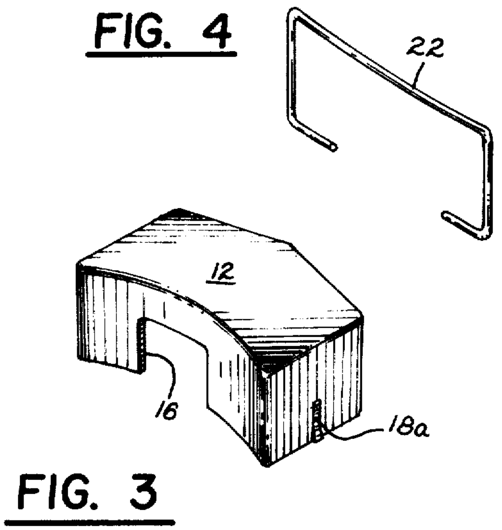
FIG. 3 shows a perspective view of the resonator of FIG. 1.
FIG. 4 shows a perspective view of the spring clip used to clip the resonator to the support plate.
Figure 10:
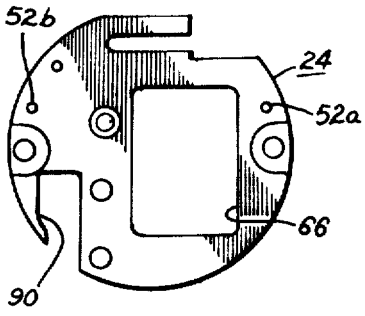
FIG. 10 shows a plane view of the bottom of the ringer base plate.
Figure 6:
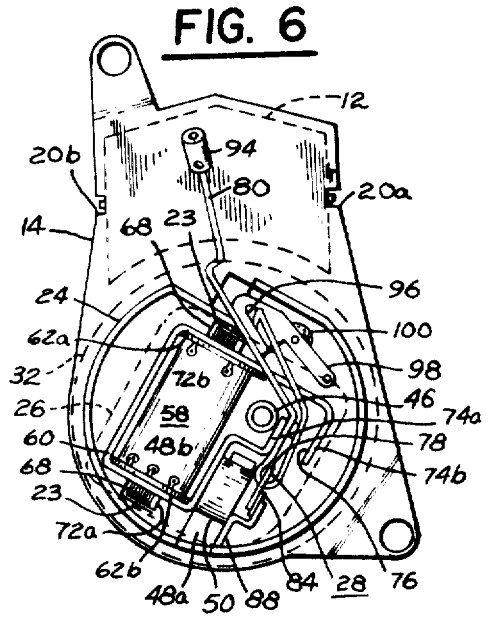
FIG. 6 shows a top view of the ringer of FIG. 1 with the resonator and the gong in phantom and with the pivot casting removed.

The ringer assembly 10 includes a non-magnetic base plate 24 (the support plate may be made of non-magnetic material so that it can serve as the base plate) having mounted thereon an electromagnetic circuit 26 (within dotted lines in FIG. 6) which operates an armature assembly 28 which in turn drives a clapper assembly 30. The ringer assembly 10 is covered by the gong 32. An aperture 34 (FIG. 1) is provided in the gong to allow an easy access to adjust the separation of the clapper assembly 30 from the gong 32. The gong 32 is attached to pivot casting 36 by a screw 38. The screw 38 also holds a protective cover 40 and a washer 42 in place on top of the gong 32. The pivot casting 36 is attached to the base plate 24 by a screw 44 (FIG. 5) which is screwed into a mounting post 46 (FIG. 6). The mounting post 46 is formed as part of the top of the base plate 24 and extends out perpendicular to the plane of the base plate 24. Also, a cradle having two projections *48a* and *48b* is formed as a part of the top of the base plate 24. The cradle holds a cylindrical shaped permanent magnet 50 in place. The pivot casting 36 helps to secure the permanent magnet 50 in the cradle along with the crimped over cradle projection *48b*. A pair of positioning projections *52a* and *52b* (FIG. 10) are formed on the bottom of the base plate 24. These projections fit into a pair of apertures *54a* and *54b* (FIG. 2) respectively in the support plate 14 to position the base plate 24 on the support plate 14. A pair of screws *56a* and *56b* are used to attach the base plate 24 to the support plate 14.

The electromagnetic circuit 26 includes a coil 58 encircled by a unitary pole piece 60. A suitable coil, for example, would have 7,200 turns of 40 gauge wire and 14,200 turns of 42 gauge wire wound on a plastic frame or bobbin having two end pieces *62a* and *62b*. The frame or bobbin is about 1 inch long and the end pieces are about 0.75 inches square. The apertures 66 and 64 in both the support plate 14 and the base plate 24 allow more space for the coil 58 without increasing the size of the ringer. A laminated iron core 68 made of iron extends through the center of the coil 58. Retainer clips 23 holds the laminated core 68 in place. The ends of the core 68 project through apertures in the pole piece 60. The portions 72*a* and 72*b* of the pole piece 60 are bent to butt against the core 68 ends to obtain good magnetic coupling between the core 68 and the pole piece 60. The unitary pole piece 60 is made of magnetizable iron. The pole piece 60 has a pair of spaced apart ends 74*a* and 74*b* which define an air gap 76. The magnetic reluctance of the pole piece 60 can be varied by changing the size of the cross section of the pole piece. One method of accomplishing this is to drill or perforate holes (not shown) in section 75 of the pole piece.

Figure 9:
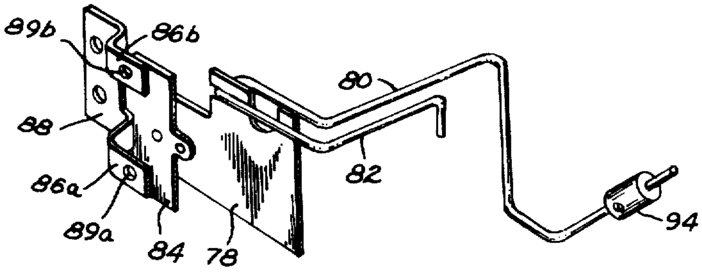
FIG. 9 shows a perspective view of the armature assembly with the weight carrying arm and the support piece and reed spring.

An armature assembly 28 (FIG. 9) having an armature 78 which carries two rods 80 and 82, one of which carries a weight 94, is connected at substantially the center of a reed spring 84. The armature 78 is riveted to the reed spring 84 with a washer (not shown) placed on each rivet between the reed spring 84 and the armature 78 to provide freedom to flex the reed spring 84 from the point of connection. The two rods 80 and 82 may also be made as one formed rod attached to the armature 78. A suitable weight for the armature assembly 28 has been found to be about 5.33 grams. The reed spring 84 is made of a suitable resilient material such as Copper Development Association Alloy 688, or nickel silver, or phosphor bronze. A suitable reed spring, for example, would be 0.250 inches wide and 0.812 inches long and have a thickness from 0.010 to 0.025 inches. The ends of the reed spring 84 are riveted to the two prongs 86*a* and 86*b* of a support piece 88. Washers (not shown) are placed on the rivets between the prongs 86*a* and 86*b* and the reed spring 84 to provide space for freedom to flex the reed spring 84 from the riveted ends. The washers are about 0.010 inches thick. The length of the reed spring 84 as measured between the centers of the rivets 86*a* and 86*b* on the support piece 88 would be about 0.688 inches. The rivets 89*a* and 89*b* connect the reed spring 84 to the prongs 86*a* and 86*b*, respectively. Suitable rivets would be 0.060 inch rivets. The support piece 88 is connected to the cradle end piece 48*a*. An aperture 90 in the base plate 24 is provided for a portion of the support piece 88 so that a suitable length of reed spring 84 can be accommodated without increasing the size of the ringer.

The armature 78 made of a suitable magnetically responsive material projects into the air gap 76 formed by the pole piece ends 74*a* and 74*b*. The armature 78 moves in the air gap 76 in response to magnetic flux changes occurring between the armature 78 and pole piece ends 74*a* and 74*b*. One pole of the permanent magnet 50 is positioned close enough to one end of the armature 78 to magnetically polarize the armature 78. The other pole of the permanent magnet 50 abutts the unitary pole piece 60 to magnetically polarize the pole piece ends 74*a* and 74*b* opposite the armature 78. The magnetized armature 78 rests in a position of equilibrium between the pole piece ends 74*a* and 74*b*. When the coil 58 is energized by an a-c signal, the magnetic flux induced in the pole piece 60 interacts with the magnetic flux of the permanent magnet 50 to cause the armature 78 to swing back and forth between the pole pieces 74*a* and 74*b* at the frequency of the applied a-c signal.

The armature 78 carries the two rods 80 and 82, both of which move as the armature 78 moves. A suitable material for the rods, for example, would be cold drawn steel wire having a diameter of 0.055 inches. The rod 80 extends out from under the gong 32 and through the aperture 16 into the resonator 12. This rod 80 is adapted to carry a weight 94 within the resonator 12. The mass of the weight 94 and its position on the rod 80 form a part of the moment of inertia of the armature assembly 28. Therefore, changing the mass of the weight 94 and/or the position of the weight 94 on the rod 80 provides a means for varying the moment of inertia of the armature assembly 28. Varying the moment of inertia of the armature assembly 28 can be used to maximize the resonant response of the armature assembly 28 to a predetermined magnetic flux change.

Figure 7:
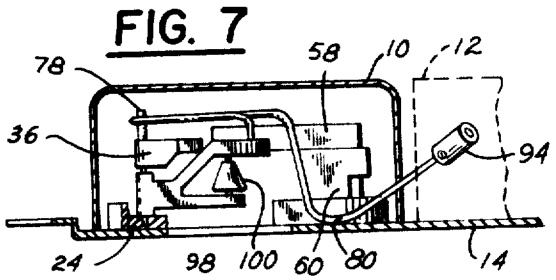
FIG. 7 shows a side view of the ringer of FIG. 5 taken along lines 7—7 and includes the extension rod and weight.
Figure 8:
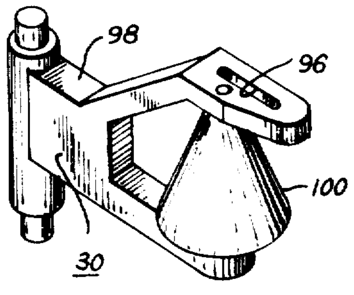
FIG. 8 shows a perspective view of the clapper assembly.

The rod 82 engages a slot 96 in the clapper assembly 30 so that movement of the rod 82 drives the clapper assembly 30. The clapper assembly 30 includes a frame 98 for carrying a clapper 100. One end of the frame 98 is pivotally mounted between the base plate 24 and the pivot casting 36 (FIG. 7). The slot 96 and the clapper 100 are spaced away from the pivotally connected end of the frame 98 so that sufficient movement of the rod 82 will move the clapper assembly 30 so that the clapper 100 strikes the gong 32. If more motion of the clapper 100 is needed than the space under the gong 32 allows, then the clapper may be placed outside the gong. One possible arrangement would be to change the shape of the resonator opening to allow a clapper placed outside the gong to swing into the resonator.

In order to get the clapper 100 to strike the gong 32, there must be sufficient amplitude of movement of the armature 78. The amplitude of movement of the armature 78 is determined by the resonant response of the armature assembly 28. When the resonant frequency is applied to the coil 58, the movement of the armature assembly 28 is maximized (in a manner explained below) thus causing the clapper 100 to strike the gong 32. When a signal other than the resonant frequency is applied to the coil 58, the movement of the armature assembly 28 is insufficient to cause the clapper 100 to strike the gong 32. In effect, all signals other than the resonant frequency are rejected.

The resonant response of the ringer is directly related to the resilience of the reed spring 84. The resilience of the reed spring 84 can be varied by using the same material and making the reed spring 84 thicker or thinner. The resonant response of the ringer is inversely related to the separation of the pole pieces 74a and 74b and the moment of inertia of the armature assembly 28.

For example, the ringer can be made to have a resonant response to a 16-⅔ hz. line frequency. In such case, the ringer would have a reed spring 84 about 0.010 inch thick made of Copper Development Association Alloy 688 (commercially available). The separation of the pole pieces 74*a* and 74*b* would be about 0.215 inches. The moment of inertia of the armature assembly 28 would be properly set by placing a weight 94 which is about 4.06 grams on the rod 80 and adjusting the position of the weight 94 on the rod 80 until the movement of the armature assembly 28 in response to the AC ringer signal is maximized. Other combinations of reed spring 84 thicknesses and separations of the pole pieces 74*a* and 74*b* and masses of weights 94 will provide the ringer a resonant response to different frequencies. This is best illustrated by the values shown in Table I below. These values were taken from ringers actually constructed.

TABLE I

| Line Frequency (hz.) | Air Gap Size (in.) | Weight (grams) | Reed Spring Thickness (in.) | Reed Spring Composition (Copper Development Alloy No.) |
|---|---|---|---|---|
| 16–2/3 | .215 | 4.06 | .010 | 688 |
| 33–1/3 | .215 | 3.74 | .014 | 688 |
| 40 | .195 | 3.07 | .016 | 688 |

The ringer is adjusted to the selected frequency by applying the selected frequency to the ringer coil 58. The clip 22 and the resonator 12 are removed and the position of the weight 94 is adjusted on the rod 80 until the movement of the armature assembly 28 is maximized. Then the position of the clapper assembly 30 relative the gong 32 can be adjusted by extending an adjustment tool through the aperture 34 in the gong 32 and bending the rod 82 to produce an acceptable ringing signal.

Although a single signal frequency is referred to throughout, it is understood that this is the peak frequency and that there exists a narrow band of frequencies around this peak frequency to which the frequency selective ringer will respond.

In operation, the ringers on the same party line are each made responsive to a different selected frequency so that applying the selected frequency causes only the selected ringer to ring. The other ringers on the same line are made nonresponsive to the selected frequency and do not ring.

The frequency ringer of the invention is compact and fits into the same space within the telephone set as the miniaturized straight line ringer. Full advantage is taken of existing space and no additional space is required for the weight 94 or the rod 80 carrying the weight 94. Removing the spring clip 22 and the resonator 12 provides a simple and easily accessible way to reach the weight 94 for adjusting the resonant response of the ringer. In addition, the frequency ringer of the invention takes full advantage of the resonator 12 to enrich the tone of the ringer. The presence of the rod 80 and weight 94 with the resonator 12 do not noticeably affect the functioning of the resonator 12.

Such a ringer as described above could be used without a resonator where the quality of the sound is not of prime importance. This ringer would not require much more space than is required for the ringer assembly above.

The foregoing description points out the novel features of this improved ringer. This novel arrangement of elements for making a frequency selective ringer results in a new and improved type of ringer with a minimum of cost. In addition, the ringer can be manufactured at a cost savings because some components are common to the miniaturized straight line ringer. The newly added components are trouble free and reliable to provide a frequency selective ringer that maintains the high standards of the telephone industry.

From the foregoing description, it will be apparent that there has been provided an improved telephone ringer. While an exemplary embodiment of the invention has been shown and described, it will be appreciated that variations and modifications thereof within the spirit and scope of the invention will undoubtedly suggest themselves to those skilled in the art. Accordingly, the foregoing description should be taken merely as illustrative and not in any limiting sense.

What is claimed is:

1. A ringer comprising:
a gong;
an electromagnetic circuit responsive to an electrical signal for generating a varying magnetic flux;
means movable in response to said varying magnetic flux;
means for mounting said electromagnetic circuit and said movable means within said gong so that said movable means strikes said gong in response to the energization of said electromagnetic circuit;
a resonator, having an opening formed therein, mounted adjacent to and exterior of said gong, and
an extension rod connected to said movable means, said extension rod including a weight, extending out of said gong and into said resonator through said opening with the weight positioned within said resonator.

2. The ringer as set forth in claim 1 wherein said movable means includes:
a movable armature responsive to said magnetic flux;
a pivotally mounted clapper, and
means for connecting said movable armature to said clapper so that said clapper strikes said gong in response to the movement of said movable armature.

3. The ringer as set forth in claim 1 wherein said weight is adjustable for tuning the resonant frequency response of said ringer.

4. A frequency selective ringer comprising:
an electromagnetic circuit for generating a periodically changing magnetic flux in response to a selected electrical frequency signal;
a movable armature spring mounted for movement in response to said magnetic flux generated by said electromagnetic circuit;
a gong covering said electromagnetic circuit and said armature;
a clapper;
means for connecting said clapper to said armature so that said clapper strikes said gong in response to the movement of said armature;
a resonator, having an opening formed therein, mounted adjacent to and exterior of said gong, and
a rod with a weight mounted thereon, for adjusting the frequency response of said ringer, said rod being connected to said armature and extending through said opening into said resonator with the weight positioned within the resonator.

5. A ringer comprising:
a resonator having an opening formed therein;
an electromagnetic circuit including a coil and means including a pole piece for providing a flux path for said coil, said pole piece having spaced ends defining an air gap in said flux path, said electromagnetic circuit being responsive to electrical alternating signals to generate a fluctuating magnetic flux in said air gap;
a reed spring fixed to a support;
an armature connected to said reed spring, so that said armature projects between said pole piece ends, said armature being movable in response to said fluctuating magnetic flux in said air gap;
a clapper;
a first means coupling said clapper to said armature;
a gong covering said electromagnetic circuit, said reed spring and support, said armature, said coupling means and said clapper, the arrangement being such that the clapper strikes the gong in response to the alternating signal applied to said electromagnetic circuit, and
a rod and a weight mounted thereon, for controlling the movement of said armature to said fluctuating magnetic flux in said air gap, said rod being connected to said armature and extending into said resonator with the weight positioned within the resonator.

6. A ringer is set forth in claim 5 including:
a support plate having said electromagnetic circuit and said support mounted thereon, and
clip means for attaching said resonator to said support plate, said clip means being positioned outside said resonator and partially under said support plate.

7. A telephone ringer comprising:
a gong;
a resonator having an opening formed therein, said resonator being positioned so that said opening is adjacent to said gong;
a non-magnetic base plate;
an electromagnetic circuit positioned on said base plate, said electromagnetic circuit having means including a unitary pole piece with spaced ends forming an air gap therebetween, said electromagnetic circuit being responsive to electrical alternating current signals to cause a fluctuating magnetic flux in said air gap;
a reed spring fixed to a support, said support being fixed to said base plate;
a magnetically responsive armature connected substantially equidistant from said ends of said reed spring, at least a portion of said armature projecting into said air gap so that said armature moves in response to said fluctuating magnetic flux across said air gap;
a clapper pivotally mounted to said base plate;
means for mounting said gong to cover said base plate, said electromagnetic circuit, said spring and support piece, said armature, and said clapper;
a first rod connected to said armature, said first rod projecting out from under said gong and through said resonator opening into said resonator;
a weight positioned on said first rod in said resonator, and
a second rod couplied between said armature and said clapper, the arrangement being such that movement of said armature in response to a change in the magnetic flux in said air gap causes said second rod to move said clapper to strike said gong.

8. A telephone ringer as set forth in claim 7 including a support plate for connection in a telephone set, said support plate having said base plate mounted thereon and having said resonator attached to said support plate by a spring clip means.

9. A telephone ringer as set forth in claim 8 wherein said gong has an aperture formed therein so that said second rod can be adjusted through said gong aperture to set the clapper separation from the gong.

* * * * *